United States Patent [19]
Crane

[11] Patent Number: 5,265,374
[45] Date of Patent: Nov. 30, 1993

[54] EDGING STRUCTURE FOR LANDSCAPING

[76] Inventor: David J. Crane, 375 Heather La., Key Biscayne, Fla. 33149

[21] Appl. No.: 651,124

[22] Filed: Feb. 6, 1991

[51] Int. Cl.$^5$ .............................. A01G 1/00
[52] U.S. Cl. .............................. 47/33; 256/1; 256/25
[58] Field of Search .............. 256/19, 1, 24, 25; 47/33

[56] References Cited

U.S. PATENT DOCUMENTS

| | | | |
|---|---|---|---|
| 1,591,509 | 7/1926 | Brookman | 47/33 |
| 4,508,319 | 4/1985 | Tappan et al. | 256/19 |
| 4,628,632 | 12/1986 | Zwier | 47/33 |
| 4,647,491 | 3/1987 | Ireland et al. | 47/32 X |

FOREIGN PATENT DOCUMENTS

| | | | |
|---|---|---|---|
| 105437 | 10/1938 | Australia | 47/33 |
| 1219 | of 1907 | United Kingdom | 47/33 |

Primary Examiner—Adnrew W. Kundrat
Attorney, Agent, or Firm—James Wetterling, Jr.

[57] ABSTRACT

An edging assembly to help control growth in landscaped areas comprising a plurality of slats formed of a material allowing the slats to be curved or bent along their length and further including joining means which interconnect correspondingly positioned ends of the slats in an end-to-end orientation. Anchor structures are disposed at spaced apart locations along the collective length of said plurality of slats and are so arranged in their end-to-end orientation so as to removably grip and concurrently secure the plurality of slats to the ground surface in surrounding or adjacent relationship to landscape to be protected from grass, weeds, or like agricultural growth.

12 Claims, 2 Drawing Sheets

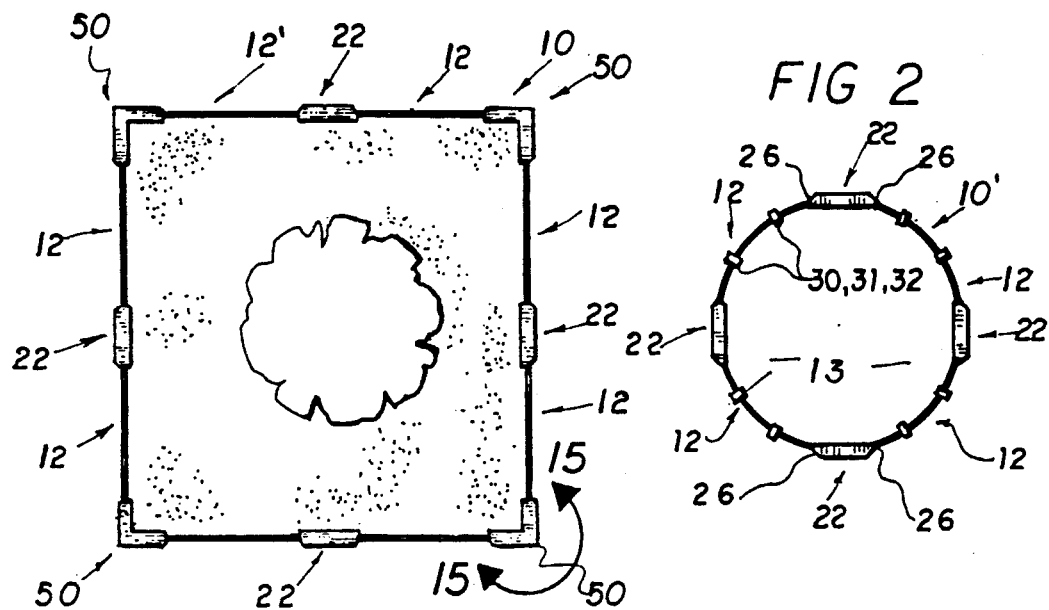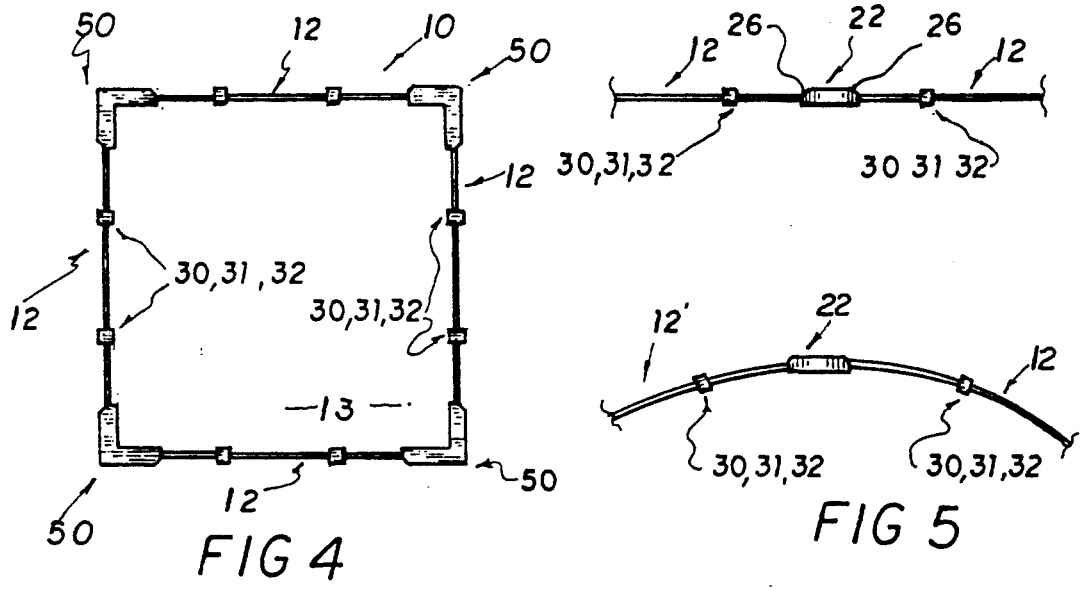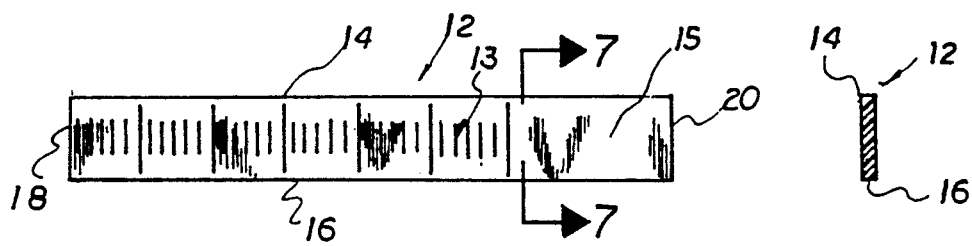

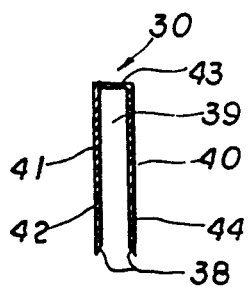
FIG 8
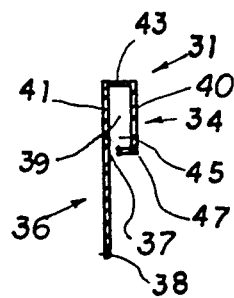
FIG 9
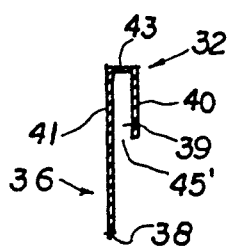
FIG 10
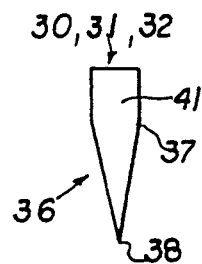
FIG 11
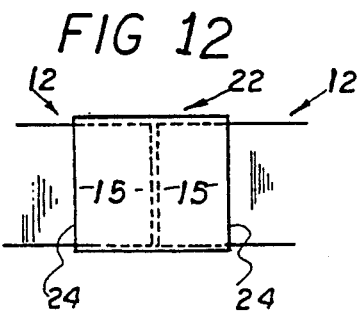
FIG 12
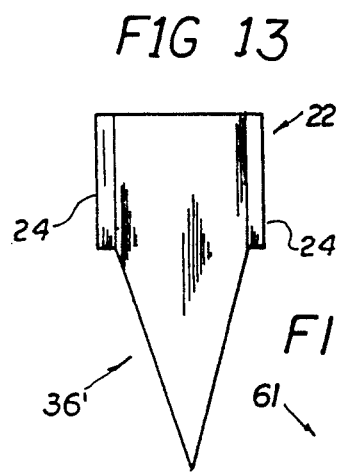
FIG 13
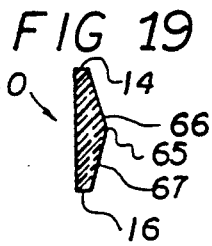
FIG 19
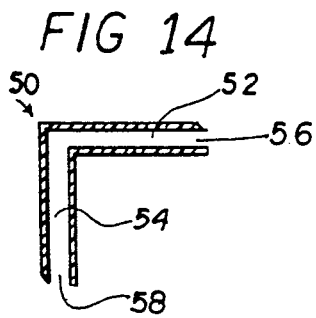
FIG 14
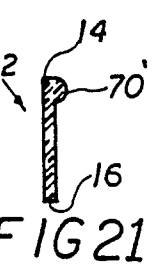
FIG 20
FIG 21
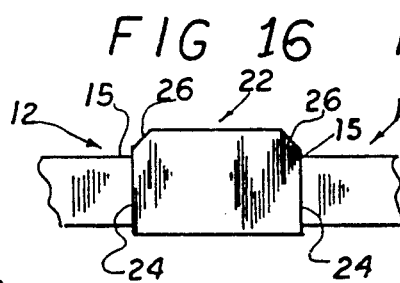
FIG 16
FIG 22
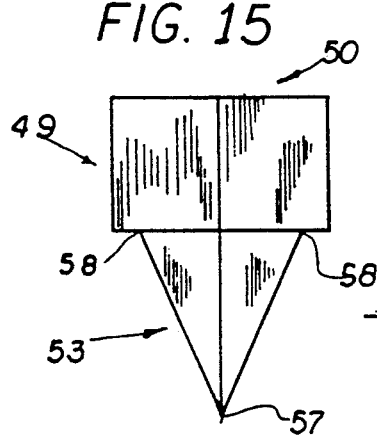
FIG. 15
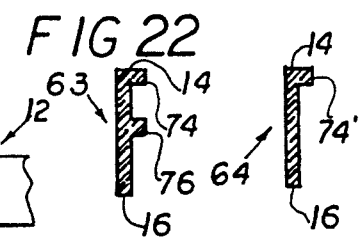
FIG 17
FIG 23
FIG 18

EDGING STRUCTURE FOR LANDSCAPING

BACKGROUND OF THE INVENTION

1. Field of the Invention

This invention relates to a barrier used in landscaping to segregate a specified area such as the area surrounding a tree trunk from outside lawn or weed growth thereby preventing such additional agricultural growth from encroaching upon the area at the base of the tree, bush, or like plant being protected.

2. Description of the Prior Art

Use of edging structures to prohibit or at least restrict the growth of grass, weeds and like agricultural growth from specified areas such as those areas surrounding trees and the like is quite well known in the prior art. Typically, such prior art assemblies include some type of barrier which are designed to either surround a designated, landscaped area or adjoin a sidewalk, building, flower bed, etc. Certain known prior art structures, to be described in greater detail hereinafter, vary from relatively complicated structures having numerous interconnecting parts to relatively simple structures.

For example, the U.S. Pat. No. 4,508,319 to Tappan, et al discloses a bender board mounting system incorporating a holder for use in landscaping such as for holding elongated bender board strips or the like. The holder includes a U-shaped channel member fixedly or separately attached to a stake member. The legs or walls of the channel member are generally rigid yet resilient and may be equipped with inwardly extending tabs to firmly grip the board within the channel of the holder. Further, the stake member of this structure may include barbed portions for impeding withdrawal from the holder from the ground in which it is inserted.

Somewhat similarly, U.S. Pat. No. 4,647,491 to Ireland, et al. discloses corrugated landscaping edging made preferably from a polymeric plastic material and formed to include a planer faced surface attached or integrally formed with a corrugated central web portion. In typical fashion, the edging is placed on the ground to delineate boundaries of lawn or garden areas and provide an effective landscape retainer to contain dirt, bark, mulch or like substance within a confined area. The subject edging structure is retained in a predetermined and preferred position by using a plurality of stakes which are inserted normally by hand into the ground through the elongated channels formed between the planer face and the central web portion of the Ireland edging structure. Further, a reverse loop is formed on the stakes and configured so as to be placed into an adjacent channel of the edging structure to add security as well as allegedly enhancing the aesthetic appearance of the overall structure. The edging strips are attached to one another by "hair pin" connectors when a closed pattern is desired.

The U.S. Pat. No. 1,591,509 to Brookman discloses means for defining the edges of garden paths and flower beds and includes a piece or strip of suitable sheet metal of convenient length and width formed at its lower edge with a suitably spaced and preferably V-shaped spur disposed in spaced relation to one another along such edge. The structure is advantageously strengthened by vertically disposed corrugations extending along the piece of metal from its upper edge to the point of the aforementioned spur. In use, the spurs can be easily caused to enter the ground and the corrugations in addition to strengthening the metal enable the strip to be easily curved or bent to conform to the configuration of the flower bed or other landscaped area being protected.

Even in light of the above, there is still a need in this area for an effective, simple, low cost, high strength edging assembly which may be packaged in a manner which renders it efficient and desirable from a retail sale standpoint and also which allows such a preferred edging assembly to be used with greater versatility from a consumer standpoint.

SUMMARY OF THE INVENTION

The present invention is directed towards an edging assembly designed to segregate specified landscape areas from agricultural growth such as but not limited to grass, weeds, etc. The subject assembly comprises a plurality of elongated slats which may or may not include strengthening means, to be described in greater detail hereinafter, but which are formed from a material having sufficient flexibility to allow each of the slats to be somewhat bent along their lengths. This latter flexible capability allows the plurality of slats to be collectively joined to one another and mounted on a supporting surface, such as the ground, in a variety of circular or other predetermined configurations. The material from which the plurality of slats are formed may be synthetic, plastic material which also is capable of being formed from a recycled supply base.

As it will become apparent hereinafter, the edging assembly of the present invention is designed to take advantage of today's plastic, rubber and like composition materials and provide a lightweight yet durable system having a plurality of cooperating removably attached components capable of application both for home and commercial use. One objective of the subject assembly is ease of installation in that the material and the various components resulting therefrom are lightweight to facilitate ease of handling and transportation by a user/installer. In addition, the components may be presented for retail sale to the consumers in a manner which requires an extremely small and convenient area thereby making the products available in a variety of combinations to even the smallest of neighborhood retail outlets. Systems of the subject assembly is further designed to enable one person to effectively set up borders and the desired containment areas and subsequently interconnect the various components of the subject assembly including the slats in either a straight line or closed, continuous configuration on the landscaped ground surface to be protected. The overall collective configuration of the assembled system can be a closed box or rectangular configuration or alternately a round or contoured configuration depending upon the specific needs and desire of the user.

Once the slats are in their operative position, a lower longitudinal edge thereof may be positioned so as to rest on the supporting surface normally defined by the ground surface or be at least slightly varied or disposed in a penetrating relation to the ground surface to further facilitate the encroachment of agricultural growth therebeyond into the protected landscaped area. In order to ensure removable placement of the plurality of slats in the desired collected configuration, the slats are arranged in an end-to-end interconnected relative orientation. Such is accomplished by joining means. The joining means is specifically structured to include a somewhat hollow interior communicating with oppositely disposed open ends. The open ends are dimensioned and configured to allow passage therethrough of opposite correspondingly positioned longitudinal ends of the slats to be connected in end-to-end adjacent relation to one another. The hollow interior or sleeve structure at each of the joining means may take an essentially straight-line configuration when adjacent ones of the slats are adjoined in an in-line relation to one another or a somewhat curved or circular segment relation to one another. In addition, the sleeve structure of the joining means may take a somewhat L-shaped configuration wherein two sleeve segments are arranged in substantially perpendicular relation to one another. The open ends are also disposed so as to receive correspondingly positioned longitudinal ends of adjacent slats in a manner which will align such slats in a substantially perpendicular relation to one another. Such L-shaped joining means are normally located at what may be considered a corner of the collected configuration of the plurality of slats.

Other components of the subject assembly include anchor means. Each of the anchor means includes a gripping portion resembling in structure the above noted sleeve structure of the joining means. More specifically, each of the gripping portions also include oppositely disposed open ends to allow passage or to receive a length of one of the segments therethrough. A portion of the anchor means more specifically is defined by an at least partially open bottom portion and two spaced apart substantially parallel side portions disposed in spaced relation to one another. The top portion of the anchor means is defined by a preferably closed top portion which overlies an upper longitudinal edge of the particular slat which it engages. Another important feature of the anchor means is the inclusion of a stake portion having a lower pointed end configured to facilitate penetration into the ground supporting surface on which the plurality of slats are collectively mounted. The stake portion is integrally attached to the gripping portion. It should be apparent therefore that use of the aforementioned anchor means in combination with the joining means allows the plurality of slats, regardless of the predetermined orientation thereof, to be easily removed and/or assembled as desired by the user.

BRIEF DESCRIPTION OF THE DRAWINGS

For a fuller understanding of the nature of the present invention, reference should be had to the following detailed description taken in connection with the accompanying drawings in which:

FIG. 1 is a top plane view of the subject edging assembly in an operative position having a closed contiguous configuration.

FIG. 2 is another embodiment similar to that of FIG. 1 wherein the components of the subject assembly are arranged in a circular or round configuration.

FIG. 3 is straight line orientation of adjoining components of the present invention in partial cut-away.

FIG. 4 is another embodiment similar to that of FIG. 1, including a plurality of adjoining components in the configuration of a square or rectangle.

FIG. 5 is a plurality adjoining components in a somewhat curved configuration shown in partial cut-away.

FIG. 6 is a front plane view of one of a plurality of slats of the subject edging assembly.

FIG. 7 is a sectional view along line 7—7 of FIG. 6.

FIG. 8 is a sectional view of one embodiment of an anchoring structure of the present invention.

FIG. 9 is a cross-sectional view of another embodiment of the anchoring structure of the present invention.

FIG. 10 is a sectional view of yet another embodiment of an anchoring structure of the present invention.

FIG. 11 is a front plane view of each of the embodiments of FIGS. 8, 9 and 10.

FIG. 12 is a front view in partial cut-away and phantom of a joining structure of the subject assembly.

FIG. 13 is yet another embodiment of an anchor structure of the present invention.

FIG. 14 is a cross-sectional view of the embodiment of FIG. 15.

FIG. 15 is a front plane view of yet another embodiment of an anchor structure of the present invention.

FIG. 16 is a top view in partial cut-away of yet another embodiment of a joining structure of the present invention.

FIG. 17 is a front plane view in partial cut-away of one slat in operative position resting on a ground or like supporting surface.

FIG. 18 is a front plane view in partial cut-away showing a lower longitudinal edge of one slat in penetrating relation to a ground surface.

FIG. 19 is a transverse sectional view of yet another embodiment of a slat of the present invention.

FIG. 20 is a transverse sectional view of yet another embodiment of a slat of the present invention.

FIG. 21 is a transverse sectional view of yet another embodiment of a slat of the present invention.

FIG. 22 is a transverse sectional view of yet another embodiment of the present invention.

FIG. 23 is a transverse sectional view of yet another embodiment of the present invention.

Like reference numerals refer to like parts throughout the several views of the drawings.

DETAILED DESCRIPTION OF THE PREFERRED EMBODIMENT

As shown in the accompanying figures, the edging assembly of the present invention is generally indicated as 10 in any one of a plurality of operative positions and configurations. FIGS. 1 and 4 show the subject assembly in a substantially continuously closed and somewhat square or rectangular configuration whereas FIG. 2 shows the components of the subject edging assembly in a circular or round configuration and indicated generally as 10'.

The subject edging assembly comprises a plurality of elongated slats generally indicated as 12 having an upper longitudinal edge 14, a lower longitudinal edge 16 and two oppositely disposed longitudinal ends 18 and 20. In one preferred embodiment, the cross-sectional configuration as shown in FIG. 7 is consistent throughout the length of each of the slats 12 wherein the lower longitudinal edge as at 16 is designed to fit and be secured on a supporting surface such as a ground surface 21 (see FIGS. 17 and 18). Alternately, the lower longitudinal edge as at 16 is designed to at least minimally penetrate the ground surface 21. This penetration of the longitudinal edge 16 serves to facilitate the encroachment of undesirable agricultural growth such as grass, weeds, etc. into a protected landscaped area generally indicated as 13 in FIGS. 1, 2 and 4.

Each of the slats 12 may be formed from a number of plastic, rubber or like semi-rigid compositions each having a sufficient flexibility to be bent at least into a curved configuration along their length as generally shown in FIGS. 2 and 5. In the preferred operative position, a plurality of such slats 12 are arranged in an end-to-end disposition and interconnected to one another at correspondingly positioned ends by a joining means generally indicated as 22. In a preferred embodiment best shown in FIGS. 12 and 16, the joining means 22 comprises oppositely disposed open ends as at 24 each communicating with a central elongated hollow sleeve. The sleeve as well as the openings 24 are designed to receive correspondingly positioned opposite ends 15 of two slats 12 arranged in an end-to-end relation to one another. It is readily apparent that by virtue of this construction, the joining means 22 serves to removably secure correspondingly positioned opposite ends 15 of adjacent slats 12. The embodiments of FIGS. 12 and 16 are shown such that the elongated sleeve interconnecting the open ends 24 is substantially linear in length. By virtue of this linear arrangement, the slats so joined as at 12 are disposed in a substantially coplaner relation to one another (see FIG. 3) or are arranged in a continuous curved type configuration as shown in FIG. 5. Another feature of the joining means 22 is the beveling of oppositely disposed exterior corners as at 26. This beveling or angled configuration 26 of these corners serves to facilitate the cutting of grass, weeds, or like growth by any conventional instrument. The beveling or angular configuration of the corners effectively prevents the weeds, grass, or like growth from collecting into corner areas where a typical cutting instrument cannot reach.

Another important component of the present invention is the anchoring means. As shown in FIGS. 8 through 11, various preferred embodiments of the anchoring means are represented as 30, 31 and 32. First, with reference to FIG. 9, the anchoring means 31 includes a gripping portion generally indicated as 34, and a stake portion generally indicated as 36. The stake portion is connected generally at its upper end integrally as at 37 to the gripping portion 34 and extends downwardly to where it terminates in a somewhat pointed configuration as at 38. The pointed end 38 serves to facilitate penetration into the ground or like supporting surface 21. The gripping portion 34 includes an elongated channel as at 39 having opposite open ends and a hollow interior communicating with those ends. Further, the gripping portion 34 includes spaced apart substantially parallel side walls as at 40 and 41. The single stake portion 36 may be integrally secured to the side wall 41. A top portion as at 43 is closed and serves to substantially overly an upper longitudinal edge 14 of the slat which it engages. Further, the bottom portion as at 45 may be open, but in the embodiment of FIG. 9 includes a retaining flange 47 serving to engage and somewhat support the lower longitudinal edge 16 of the slat which it engages.

In the embodiment of FIG. 10 the anchor means 31 has the same basic construction except that the bottom portion as at 45' is completely open. In either of the embodiments the outermost wall as at 40 may be somewhat pivoted or moved outwardly away from the opposite wall 41 so as to effectively be clipped or locked onto the particular slat 12 which it engages. Movement of the outermost side wall 40 is due to the fact that the material from which each of the anchor means are formed is somewhat flexible and in effect may pivot about the upper portion 43.

The embodiment of the anchor means 30 (FIG. 8) is similar in overall configuration to the remainder of the embodiments 31 and 32. However, the anchor means 30 includes two spaced apart stake segments 42 and 44 each terminating in a pointed end as at 38 to facilitate penetration into the supporting ground surface 21. The anchor means in the various embodiments are represented as reference numerals 30, 31 and 32 in FIGS. 2, 3, 4 and 5 to show the overall concept and placement of such anchor means relative to the other components of the present invention. Any of the embodiments 30, 31, or 32 could be utilized for the indicated anchor means.

With reference to FIGS. 14 and 15, yet another embodiment of the anchor means (and forming means) is generally represented as 50 and includes the central hollow elongated channel. The channel is divided into right angular segments 52 and 54 each communicating with a separate open end as at 56 and 58. The open ends 56 and 58 as well as the channel segments 52 and 54 are intended to receive opposite ends of correspondingly positioned slats 12 so as to consecutively join the ends as well as anchor the slats so joined. It should be apparent therefore that the anchoring means 50 may serve equally as a joining means the difference being that the gripping portion as at 49 in addition to connecting corresponding ends of adjacent right angularly disposed slats also includes the stake portion 53 which also has right angular segments and a pointed lower end as at 57 to facilitate penetration into the ground surface 21. The upper end as at 58 is integrally secured to the gripping portion 49 as shown. Along the same lines, it should be noted that structures which serve as the joining means as in the embodiment of FIG. 13 may also include a depending stake portion 36' so that alternately, the joining means 22' of FIG. 13 may be used both as a structure to join correspondingly positioned ends 15 of adjacent slats 12 and also to mount such ends in a removable fashion into the supporting ground as at 21.

The embodiments of FIGS. 19 through 23 represent slots indicated respectively as 60 through 64 each having integrally formed strengthening means formed thereon. In the embodiment of FIG. 19 the strengthening means includes a thicker cross-sectional mid portion as at 65 tapering to thinner cross-sectional areas towards the opposite longitudinal ends 14 and 16 in a substantially angular orientation as at 66 and 67.

FIG. 20 defines the strengthening means of the slat 61 as two spaced apart ribs 70 and 72. Rib 70 is located contiguous to the upper longitudinal edge 14 and extends along the length thereof. The other rib 72 is disposed in spaced parallel relation to the rib 70 and extends the length of the slat 61 intermediate the opposite longitudinal edges 14 and 16. The embodiment of FIG. 21 shows a similar strengthening means as that of the embodiment of FIG. 20 but absent the intermediate rib 72. To the contrary, only a single rib 70' exists which is contiguous to the upper longitudinal edge 14.

Similarly, the embodiments of FIGS. 22 and 23 shows the existence of two spaced apart ribs 74 and 76 (see FIG. 22) each having a somewhat rectangular cross-sectional configuration. The rib 74 is contiguous to the upper longitudinal edge 14 and the intermediate rib 76 lies between the longitudinal edges 14 and 16. Similarly,, the embodiment of FIG. 23 includes a singular rib 74' extending along the length of the slat 64 and being contiguous to the upper longitudinal edge 14.

Further with regard to FIG. 6, yet another embodiment of the present invention comprises a measuring scale or like indicia means generally indicated as 13 on one or both of the exposed surfaces 15 of one or more slats 12. This measuring indicia or scale may be marked off in inches, feet, or in the metric system as applicable. The purpose of the measuring scale 13 is to allow the user of the subject plurality of slats of the edging system herein to cut to length, as preferred, any one or all of the slats so as to define a configuration of precise dimension and configuration. As stated above, the material from which the slats are formed are severable, utilizing any of a variety of prior art and well known cutting tools.

Now that the invention has been described, What is claimed is:

1. An edging assembly for segregating a ground area from grass, weeds, or other agricultural growth, said assembly comprising:
   a. a plurality of slats each having an elongated configuration and formed of an at least partially flexible material,
   b. said plurality of slats structurally adapted for selective placement in an operative position defined by end-to-end disposition of said slats relative to one another and supporting engagement of one longitudinal edge of said slats adjacent a supporting surface,
   c. joining means disposed at a junction of correspondingly positioned ends of adjacent slats and structured for engagement and interconnection of the correspondingly positioned ends thereof,
   d. a plurality of anchor means connected to said plurality of slats at spaced locations along a collective length of said plurality of slats and structured for removably securing said slats on a ground surface,
   e. at least one of said anchor means including a gripping portion formed at one end thereof and a stake portion connected to said gripping portion and said gripping portion adapted to removably engage a slat and said stake portion being adapted to removably penetrate the ground surface in supporting relation to the gripping portion and the slat engaged thereby, and
   f. said gripping portion of said one anchor means being defined by an interior hollow channel open at both ends and dimensioned and configured to receive a length of one slat therein such that said one slat extends outwardly through each of said opposite ends, said channel including a bottom portion being at least partially opened to allow passage of a length of said one slat therethrough into said interior hollow channel,
   g. said channel further comprising oppositely disposed spaced apart sidewalls and a top portion, said sidewalls disposed in overlying, confronting relation to front and rear sides of said one slat and said top portion disposed in overlying relation to an upper longitudinal edge of said one slat, and
   h. one of said sidewalls comprising a retaining flange formed on a lower longitudinal edge thereof and extending substantially transversely across said bottom portion in supporting engagement with a lower edge of said one slat.

2. An assembly as in claim 1 wherein at least one of said plurality of slats comprises strengthening means integrally formed thereon and extending along the length thereof and projecting outwardly from at least one surface thereof and structured for strengthening said one slat.

3. An assembly as in claim 2 wherein said strengthening means comprises at least one elongated rib integrally formed on one of said slats and extending continuously along the length thereof between and in spaced relation to opposite longitudinal edges thereof.

4. An assembly as in claim 2 wherein said strengthening means comprises two elongated spaced apart ribs integrally formed on one of said slats and extending along the length thereof in substantially parallel relation to one another.

5. An assembly as in claim 4 wherein one of said ribs extends contiguous to an upper longitudinal edge of said one slat and extends along the length thereof, the other of said ribs disposed in spaced, parallel relation to said one rib and between opposite longitudinal edges of said one slat.

6. An assembly as in claim 1 wherein said joining means comprises a sleeve structure having a substantially hollow interior portion and oppositely disposed open ends communicating with said hollow interior portion, said open ends each dimensioned and configured to receive passage of a different longitudinal end of adjacent slats therethrough and into said hollow interior portion.

7. An edging assembly for segregating a ground area from grass, weeds, or other agricultural growth, said assembly comprising:
   a. a plurality of slats each having an elongated configuration and formed of an at least partially flexible material,
   b. said plurality of slats structurally adapted for selective placement in an operative position defined by end to end disposition of such slats relative to one another and in supporting engagement of one longitudinal edge of each slat adjacent a supporting surface,
   c. at least one of said plurality of slats comprising strengthening means integrally formed thereon and extending along the length thereof and projecting outwardly from at least one surface thereof and structured for strengthening of said one slat,
   d. said strengthening means comprising an integrally formed substantially wedged shaped cross sectional transverse configuration defined by a midsection thereof having a greater transverse dimension than a remainder of said slat and gradually and consistently diminishing outwardly therefrom towards opposite longitudinal edges of said one slat,
   e. joining means disposed at a junction of correspondingly positioned ends of adjacent slats and structured for engagement and interconnection of the correspondingly positioned ends thereof,
   f. a plurality of anchors means connected to said plurality of slats at spaced locations along a collective length of said plurality of slats and structured for removably securing said slats on a ground surface, and
   g. at least one of said anchor means including a gripping portion formed at one end thereof and a stake portion connected to said gripping portion and said gripping portion adapted to removably engage a slat and said stake portion being adapted to removably penetrate the ground surface in supporting relation to the gripping portion of the slat engaged thereby.

8. An edging assembly for segregating a ground area from grass, weeds, or other agricultural growth, said assembly comprising:

a. a plurality of slats each having an elongated configuration and formed of an at least partially flexible material, b. said plurality of slats structurally adapted for selective placement in an operative position defined by end-to-end disposition of said slats relative to one another and supporting engagement of one longitudinal edge of said slats adjacent a supporting surface, c. at least one of said plurality of slats comprising strengthening means integrally formed thereon and extending along the length thereof and projecting outwardly from at least one surface thereof and structured for strengthening said one slat, d. joining means disposed at a junction of correspondingly positioned ends of adjacent slats and structured for engagement and interconnection of the correspondingly positioned ends of adjacent slats, e. said joining means comprising a sleeve structure having a substantially hollow interior portion and oppositely disposed open ends communicating with said hollow interior portion, said open ends each dimensioned and configured to receive passage of a different longitudinal end of adjacent slats therethrough and into said hollow interior portion, f. said sleeve structure comprising oppositely disposed, spaced apart exterior corners each having a beveled configuration, g. a plurality of anchor means connected to said plurality of slats at spaced locations along a collective length of said plurality of slats and structured for removably securing said slats on a ground surface, and h. at least one of said anchor means including a gripping portion formed at one end thereof and a stake portion connected to said gripping portion and said gripping portion adapted to removably engage a slat and said stake portion being adapted to removably penetrate the ground surface in supporting relation to the gripping portion and the slat engaged thereby.

9. An assembly as in claim 8 wherein said sleeve structure further comprises a base secured to a lower end thereof and being structurally adapted to penetrate a ground surface in supporting relation to said sleeve structure at any slat ends disposed therein.

10. An assembly as in claim 8 wherein said open ends are disposed in co-axial relation to one another and said hollow interior portion comprises a substantially straight-line configuration interconnecting said open ends.

11. An assembly as in claim 8 wherein said sleeve structure and said hollow interior portion comprises a substantially L-shaped configuration, said open ends relatively disposed to orient adjacent slats engaged thereby in substantially perpendicular relation to one another.

12. An assembly as in claim 1 wherein said side walls of said channel are detached from one another at said bottom portion and are positionable away from one another thereat to facilitate passage of the length of said slat through said bottom portion into and out of the interior of said channel.

* * * * *